US009869414B2

(12) United States Patent
Banker (10) Patent No.: US 9,869,414 B2
(45) Date of Patent: Jan. 16, 2018

(54) TUBULAR CONNECTION AND ASSOCIATED THREADFORM (71) Applicant: ULTRA PREMIUM OILFIELD SERVICES, LTD., Houston, TX (US)

(72) Inventor: Edward O. Banker, Houston, TX (US)

(73) Assignee: ULTRA PREMIUM OILFIELD SERVICES, LTD., Houston, TX (US)

( * ) Notice: Subject to any disclaimer, the term of this patent is extended or adjusted under 35 U.S.C. 154(b) by 0 days.

(21) Appl. No.: 15/423,352

(22) Filed: Feb. 2, 2017

(65) Prior Publication Data
US 2017/0146160 A1 May 25, 2017

Related U.S. Application Data (63) Continuation-in-part of application No. 13/114,757, filed on May 24, 2011.

(51) Int. Cl.
*F16L 15/06* (2006.01)
*E21B 17/042* (2006.01)

(52) U.S. Cl.
CPC .......... *F16L 15/06* (2013.01); *E21B 17/042* (2013.01)

(58) Field of Classification Search
CPC ....... F16L 15/06; F16L 15/001; F16L 15/004; E21B 17/042; E21B 43/106
USPC ........................................ 285/333, 334, 390
See application file for complete search history.

(56) References Cited

U.S. PATENT DOCUMENTS

| | | | | |
|---|---|---|---|---|
| 3,989,284 A | * | 11/1976 | Blose | E21B 17/042 285/332.2 |
| 4,712,815 A | * | 12/1987 | Reeves | E21B 17/042 285/334 |
| 4,822,081 A | * | 4/1989 | Blose | F16L 15/003 285/334 |
| 5,338,074 A | * | 8/1994 | Barringer | F16L 15/004 285/334 |
| 5,360,240 A | * | 11/1994 | Mott | F16L 47/16 285/334 |
| 5,415,442 A | * | 5/1995 | Klementich | E21B 17/0423 285/331 |
| 5,454,605 A | * | 10/1995 | Mott | E21B 17/042 285/333 |
| 5,462,315 A | * | 10/1995 | Klementich | E21B 17/0423 285/24 |
| 5,765,836 A | * | 6/1998 | Banker | F16J 15/04 277/603 |
| 6,158,785 A | * | 12/2000 | Beaulier | E21B 17/042 285/334 |
| 6,174,001 B1 | * | 1/2001 | Enderle | E21B 17/0423 285/334 |
| 6,206,436 B1 | * | 3/2001 | Mallis | E21B 17/042 285/334 |

(Continued)

*Primary Examiner* — David E Bochna
*Assistant Examiner* — James A Linford
(74) *Attorney, Agent, or Firm* — Morgan, Lewis & Bockius LLP (57) ABSTRACT

A tubular connection is formed by a box member and a pin member, each of which has a tapered constant pitch thread. A profile defined by the thread of at least one of the pin member and the box member results in a pitch line that is a stepped pitch line. The stepped pitch line configuration may produce a wide radial band of substantive contact between the stab flanks of the pin member and box member upon full make-up of the connection.

15 Claims, 6 Drawing Sheets

(56) References Cited

U.S. PATENT DOCUMENTS

| | | | |
|---|---|---|---|
| 6,254,146 B1 * | 7/2001 | Church | E21B 17/042 285/334 |
| 6,322,110 B1 * | 11/2001 | Banker | E21B 17/042 285/333 |
| 6,412,831 B1 * | 7/2002 | Noel | F16L 15/004 285/333 |
| 6,550,821 B2 * | 4/2003 | DeLange | E21B 43/103 285/332 |
| 6,578,880 B2 * | 6/2003 | Watts | F16L 15/001 285/334 |
| 6,832,789 B2 * | 12/2004 | Church | E21B 17/0423 285/333 |
| 6,905,149 B2 * | 6/2005 | DeLange | E21B 17/042 285/13 |
| 7,243,957 B2 * | 7/2007 | Reynolds, Jr. | E21B 17/0423 285/333 |
| 7,331,614 B2 * | 2/2008 | Noel | F16L 15/001 285/334 |
| 7,334,821 B2 * | 2/2008 | Dutilleul | E21B 17/042 285/333 |
| 7,438,329 B2 * | 10/2008 | DeLange | E21B 17/042 285/333 |
| 7,458,616 B2 * | 12/2008 | Reynolds, Jr. | F16L 15/001 285/333 |
| 7,475,917 B2 * | 1/2009 | Sivley, IV | F16L 15/004 285/333 |
| 7,527,304 B2 * | 5/2009 | Mallis | E21B 17/0423 285/333 |
| 7,562,911 B2 * | 7/2009 | Reynolds, Jr. | E21B 17/042 285/334 |
| 7,575,255 B2 * | 8/2009 | Reynolds, Jr. | E21B 17/0423 285/333 |
| 7,588,269 B2 * | 9/2009 | Church | F16L 15/006 285/333 |
| 7,607,333 B2 * | 10/2009 | Sivley, IV | F16L 15/004 72/367.1 |
| 7,686,350 B2 * | 3/2010 | Reynolds, Jr. | F16L 15/004 285/334 |
| 7,690,696 B2 * | 4/2010 | Mallis | E21B 17/0423 285/333 |
| 7,690,697 B2 * | 4/2010 | Church | E21B 17/08 285/333 |
| 7,717,478 B2 * | 5/2010 | Reynolds, Jr. | E21B 17/08 285/333 |

* cited by examiner

TUBULAR CONNECTION AND ASSOCIATED THREADFORM

This application is a continuation-in-part of U.S. application Ser. No. 13/114,757, filed May 24, 2011.

TECHNICAL FIELD

Field of the Invention

The present application is directed to tubular connections and, more particularly, to a tubular connection having a threadform that is configured to increase resistance to axial compressive loading.

BACKGROUND

The Oil & Gas upstream production industry drills wells of ever increasing depth and complexity to find and produce raw hydrocarbons. The industry routinely uses steel pipe (Oil Country Tubular Goods) to protect the borehole (casing) and to control the fluids produced therein (tubing). Casing and tubing are made and transported in relatively short lengths and installed in the borehole one length at a time.

One way to drill a borehole more efficiently is to conserve borehole diameter. The most straightforward way to achieve this is to minimize the diameter of the pipe connections. Two types of premium oilfield connections, namely integral flush joints and slim diameter high performance connections have been utilized for these purposes. The outer diameter of a flush joint connection is substantially the same as the outside diameter of the body of the pipe. In other words, the connection is contained within the wall thickness of the pipe body.

It would be desirable to provide slim diameter and flush-type connections, as well as other connections, with improved compression ratings. To better understand compressive strength in flush and slim-diameter connections, some terminology should be established. Threads include a raised portion, the ridge or tooth, that fits into the recessed thread groove. The threadform is defined by a root, crest, stab flank, and load flank, each of which is actually a helically extending surface. As exemplified by FIG. 1, a profile (i.e., 2-dimensions) of the threadform is defined by a cross-sectional plane extending radially outward from a central axis of the tubular member or thread and includes a repeating "sequence" of ridge segments 10a, 10b, 10c and groove segments 12a, 12b, 12c, each ridge segment defined by the stab flank 14, crest 16 and load flank 18, and each groove segment defined by the load flank 18, root 20 and stab flank 14. Each groove segment of the profile is formed by a respective axial segment of the helical groove of the three-dimensional thread and each ridge segment of the profile is formed by a respective axial segment of the helical ridge of the three-dimensional thread.

Any given threadform will have one and only one "pitch line," a term that is well known and understood by those of ordinary skill in the art of thread design. For example, ASME B1.7-2006 (entitled "Screw Threads: Nomenclature, Definitions, and Letter Symbols"), a well-known industry standard adopted by the American Society of Mechanical Engineers, defines the "pitch line" as the generator of the "pitch cone" for a tapered threadform. "Pitch cone" is defined in the same standard as "an imaginary cone of such apex angle and location of its vertex and axis that its surface would pass through a taper thread in such a manner as to make the axially measured widths of the thread ridge and thread groove equal." Thus, the "pitch line" is an imaginary line 22 on the threadform profile that intersects the stab flank and the load flank such that the axial width $W_R$ of the thread ridge equals the axial width $W_T$ of the thread groove.

Figure 1:
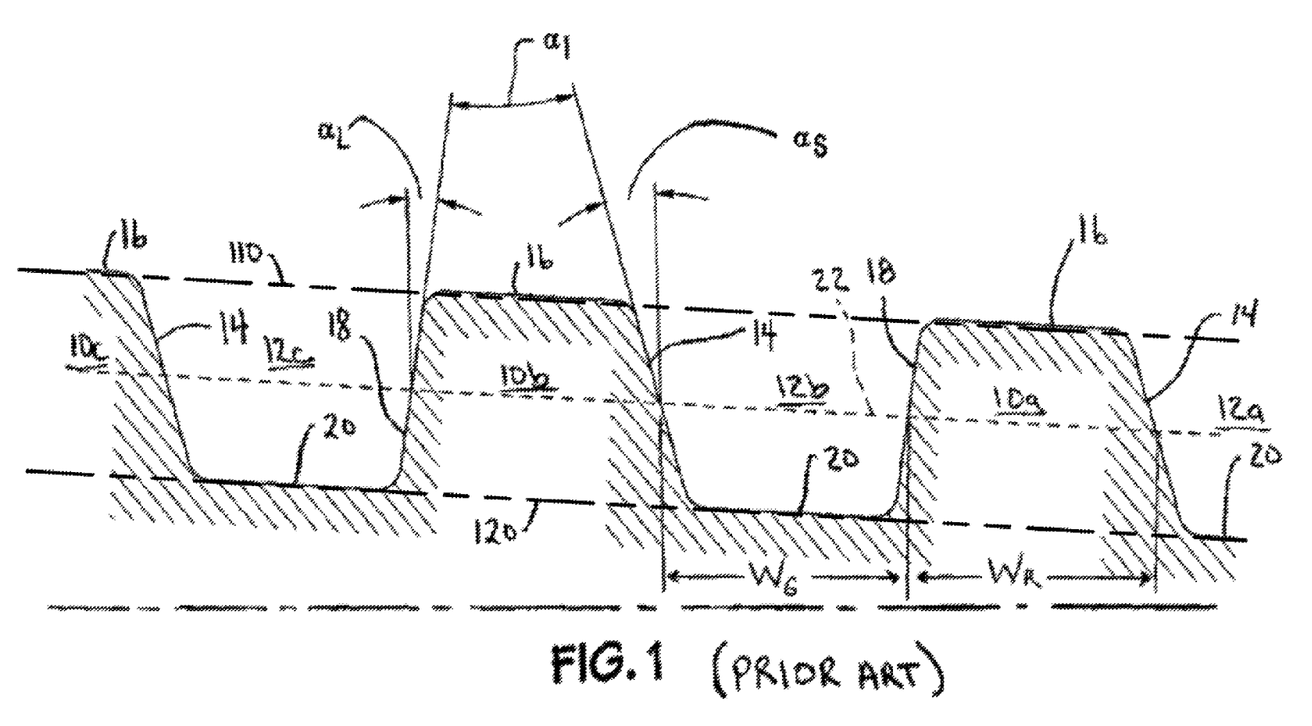
FIG. 1 is a schematic view of an exemplary prior art threadform having a positive stab flank angle and a positive load flank angle.

As shown in FIG. 1, the pitch line has traditionally been understood to be a single straight line intersecting the load flanks and stab flanks at specified points. This is also reflected in the ASME standard, which explains that the pitch cone—the imaginary three-dimensional surface generated by rotating the pitch line about the central axis of the thread—"is located equidistant between the sharp major and minor cones of a given thread." As shown in FIG. 1, the major cone bounds the crest of an external thread taper, while the minor cone bounds the root. Thus, the pitch line has historically been understood not only to be a single straight line but also to be a single straight line located at the particular location shown in FIG. 1 and reflected in FIG. 44 of the ASME standard.

The load flank and the stab flank are traditionally angled to create clearances between the tooth and groove so the two members that comprise the thread can fit together initially and be assembled without damage. The stab flank angle as and load flank angle $U_L$ are taken as positive as illustrated in FIG. 1. The included angle $a_1$ is the algebraic sum of the two angles.

Square threads have substantially no flank angle and therefore are desirable because they provide good tension and compression load transfer. As described in U.S. Pat. No. 6,322,110, square or near square threads may include at least one relieved surface on the stab flanks that extends from the crest to some point on the stab flank surface; i.e., a surface with a larger stab flank angle to create additional clearance for the load flanks during make-up of the connection. The larger angles(s) alleviate some of the large thread flank clearance concerns. The clearance between the load flanks is "transferred" to the stab flanks as the connection ends come in contact and further torque is applied. Further make-up of the connection may allow the stab flanks to come back in contact, but typically only creating a helical point or line of contact or substantive contact that is only able to absorb so much stress upon final make-up.

As described in the preferred embodiment of U.S. Pat. No. 6,322,110, multiple angles (i.e., relieved surfaces) are used on the stab flank. In the "stabbed" position, i.e., as the male (or pin) of one connection is initially placed into the female (or box) of the mating connection, these surfaces enable the stab-flank of the pin thread to rest on the stab flank of the box thread while the load flanks have sufficient clearance to allow thread engagement as the pin is rotated to be "made-up," i.e., rotated towards the final, fully engaged position of the connection. Furthermore, the relieved surface(s) cause the threads to engage such that the clearance between the load flanks is reduced during make-up because certain of the surfaces acted as a cam or inclined plane to reduce the clearance in certain parts of the thread. However, it is connection engagement (i.e., interaction between parts of the connection other than the threads (such as a metal seal)) that actually halts the forward progress of the threaded connection and will causes the contact within the threaded portion of the connection to shift from the stab flank to the load flank. This same movement shifts the existing clearance from the load flank to the stab flank. Make-up is achieved as the threads are driven together by applied torque which rotates the pin member, forcing the pin load-flank to move relative to the box load-flank. The shape of the stab flanks are such that as the threads reach final position, i.e., full make-up, the pin and box threads make two-dimensional point contact at the pitch-line.

In U.S. Pat. No. 6,322,110 the pitch line of the threadform is a straight line that produces a pitch cone when rotated about the center axis of the tubular member or thread. The pitch line is located equidistant between the root and crest along each of the stab flank and the load flank, which is standard for tubular connections. Controlled by tolerance limitations within the manufacturing process, the actual intersections of the pitch line on the stab flanks at full make-up may have a small clearance, surface contact, or a slight interference fit. However, the use of a threadform with a traditional straight pitch line is the only configuration shown in the '110 patent. This is shown by FIG. 5B of the '110 patent and the corresponding discussion at column 11, lines 41-56 (hereby incorporated by reference), which shows that pitch line 56 is a straight line, as generally understood in the art at the time. Such a configuration will limit the area of contact that can be created between the stab flanks of the pin and box members.

SUMMARY

In one aspect, a tubular connection includes a box member and a pin member. The pin member has a tapered, constant pitch thread having a root, a crest, a stab flank and a load flank. The stab flank of the pin member thread has a base surface and a second surface, the base surface extending radially outward and away from the root at a base angle relative to radial, the second surface extending radially outward and away from the end of the base surface at a second angle relative to radial, the second angle greater than the base angle. The box member has a tapered, constant pitch thread having a root, a crest, a stab flank and a load flank. The stab flank of the box member thread has a base surface and a second surface, the base surface extending radially inward and away from the root at a base angle relative to radial, the second surface extending radially inward and away from the end of the base surface at a second angle relative to radial, the second angle greater than the base angle. A profile defined by the root, crest, stab flank and load flank of at least one of the pin member or the box member results in a pitch line of the pin member or box member that is a stepped pitch line. As explained above, any given threadform will have one and only one "pitch line," a term that is well known and understood by those of ordinary skill in the art of thread design.

In the connection of the preceding paragraph, a first cycle of the stepped pitch line is defined by a first line segment passing through a first thread ridge segment of the profile and a second line segment passing through a first thread groove segment of the profile, the second line segment angularly offset from the first line segment such that the first line segment is not parallel to the second line segment.

In the connection of any preceding paragraph, a second cycle of the stepped pitch line is defined by a first line segment through a second thread ridge segment of the profile and a second line segment through a second thread groove segment of the profile, the first thread groove segment bounded by the first thread ridge segment and the second thread ridge segment, the second thread groove segment adjacent the second thread ridge segment. The first line segment of the second thread ridge segment runs parallel to, but offset radially from the first line segment of the first thread ridge segment. The second line segment of the second thread groove segment runs parallel to, but radially offset from the second line segment of the first thread groove segment.

In the connection of any preceding paragraph, a thread taper associated with the one of the box member or the pin member is angularly offset from both the first line segment and the second line segment.

In the connection of any preceding paragraph, the second line segment is offset from a central longitudinal axis of the pin member or box member by an angle that is greater than any angle of offset that may exist between the first line segment and the central longitudinal axis.

In the connection of any preceding paragraph, each of the pitch line of the pin member and the pitch line of the box member is a stepped pitch line.

In the connection of any preceding paragraph, the pitch line of the pin member intersects the stab flank at a pin thread intersecting location radially outward of a mid-point of the height of the stab flank of the pin member thread, and the base surface of the stab flank of the pin member thread extends outward to the pin thread intersecting location. Likewise, the pitch line of the box member intersects the stab flank at a box thread intersecting location radially inward of a mid-point of the height of the stab flank of the box member thread, and the base surface of the stab flank of the box member thread extends inward to the box thread intersecting location.

In the connection of any preceding paragraph, when the connection is fully made up, the stab flank of the pin member thread and the stab flank of the box member thread are in substantive contact over a radial band.

In the connection of any preceding paragraph, the radial band of substantive contact extends a radial distance that is equal to or greater than at least seventeen percent of stab flank height.

In the connection of any preceding paragraph, when the connection is fully made up, the mid-point of the stab flank height of the pin member substantially aligns with the mid-point of the stab-flank height of the box member, and the radial band of substantive contact extends both radially outward of and radially inward of the substantially aligned mid-points.

In the connection of any preceding paragraph, the stab flank of the pin member thread interacts with the stab flank of the box member thread during connection make-up to move the load flank of the pin member thread into substantive contact with the load flank of the box member thread.

In the connection of any preceding paragraph, the stab flank of the pin member thread and the stab flank of the box member thread are configured to interact during connection make-up such that the load flank of the pin member thread moves into substantive contact with the load flank of the box member thread before the pin member thread and the box member thread reach sixty-five percent of radial make-up engagement depth.

In another aspect, a threaded tubular member includes an elongated body having an axial passage therethrough. An end portion of the body has a tapered, constant pitch thread having a root, a crest, a stab flank and a load flank. The stab flank has a base surface and a second surface, the base surface extending radially outward and away from the root at a base angle relative to radial, the second surface extending radially outward and away from the end of the base surface at a second angle relative to radial, the second angle greater than the base angle. A profile defined by the root, crest, stab flank and load flank of at least one of the pin member or the box member results in a pitch line of the pin member or box member that is a stepped pitch line.

In the tubular member of the preceding paragraph, a first cycle of the stepped pitch line is defined by a first line segment passing through a first thread ridge segment of the profile and a second line segment passing through a first thread groove segment of the profile, the second line segment angularly offset from the first line segment such that the first line segment is not parallel to the second line segment.

In the tubular member of the preceding paragraph, a thread taper defined by the profile is angularly offset from both the first line segment and the second line segment.

In another aspect, a tubular connection includes a pin member and box member. The pin member has a tapered, constant pitch thread having a root, a crest, a stab flank and a load flank. The stab flank of the pin member thread has a base surface and a second surface, the base surface extending radially outward and away from the root at a base angle relative to radial, the second surface extending radially outward and away from the end of the base surface at a second angle relative to radial, the second angle greater than the base angle. The box member has a tapered, constant pitch thread having a root, a crest, a stab flank and a load flank, the stab flank of the box member thread having a base surface and a second surface, the base surface extending radially inward and away from the root at a base angle relative to radial, the second surface extending radially inward and away from the end of the base surface at a second angle relative to radial, the second angle greater than the base angle. When the connection is fully made up, the stab flank of the pin member thread and the stab flank of the box member thread are in substantive contact over a wide radial band.

In the tubular connection of the preceding paragraph, the wide radial band of contact extends a radial distance that is equal to or greater than at least seventeen percent of stab flank height.

In the tubular connection of either of the preceding two paragraphs, when the connection is fully made up, the mid-point of the stab flank height of the pin member substantially aligns with the mid-point of the stab-flank height of the box member, and the wide radial band of contact extends both radially outward of and radially inward of the substantially aligned mid-points.

It has been discovered that the wide band contact mentioned above greatly improves connection performance in compressive loading by adding area to the connection's cross-section that reacts to and resists compressive loads, thereby increasing the total compressive capacity of the connection to material yield. Such band contact also immediately reacts to compressive loading and limits movement within the connection, thereby isolating and protecting the metal seal during mechanical or thermal load cycles and improving the tri-axial pressure integrity of the tubular connection.

In a further aspect, a tubular connection includes a pin member and a box member. The pin member has a tapered, constant pitch thread having a root, a crest, a stab flank and a load flank. The stab flank of the pin member thread has a base surface and a second surface, the base surface extending radially outward and away from the root at a base angle relative to radial, the second surface extending radially outward and away from the end of the base surface at a second angle relative to radial, the second angle greater than the base angle. The box member has a tapered, constant pitch thread having a root, a crest, a stab flank and a load flank, the stab flank of the box member thread having a base surface and a second surface, the base surface extending radially inward and away from the root at a base angle relative to radial, the second surface extending radially inward and away from the end of the base surface at a second angle relative to radial, the second angle greater than the base angle. The stab flank of the pin member thread interacts with the stab flank of the box member thread during connection make-up to move the load flank of the pin member thread into substantive contact with the load flank of the box member thread.

In the tubular connection of the preceding paragraph, the stab flank of the pin member thread and the stab flank of the box member thread are configured to interact during connection make-up such that the load flank of the pin member thread moves into substantive contact with the load flank of the box member thread before the pin member thread and the box member thread reach sixty percent of radial make-up engagement depth.

DETAILED DESCRIPTION

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

Figure 2:
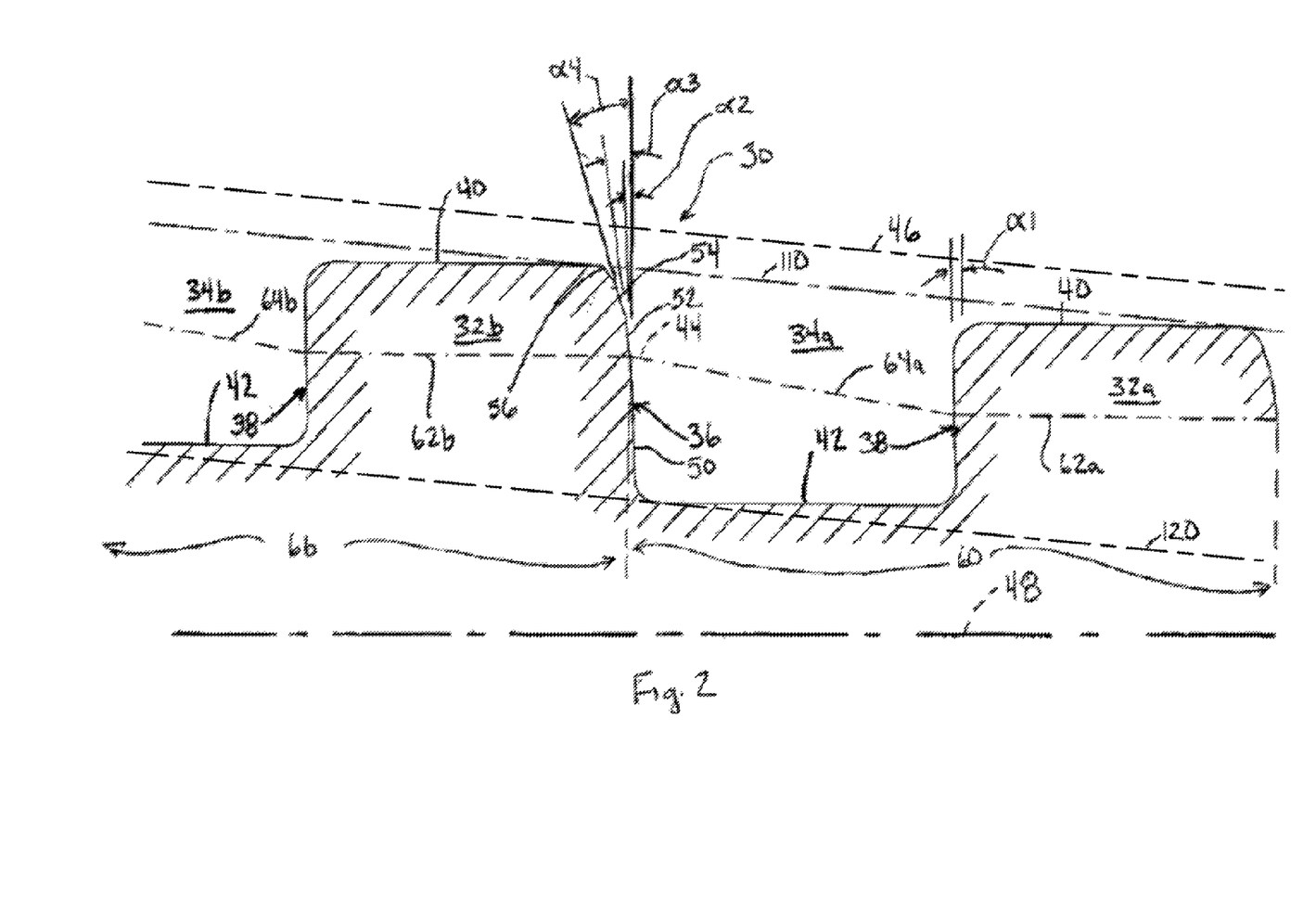
FIGS. 2 and 3 are schematic views of one embodiment of a threadform of the present invention.

Referring initially to FIG. 2, a threadform profile 30 is shown with two ridge segments 32a, 32b and two groove segments 34a, 34b. It is recognized that a typical profile of the entire thread would be made up of a greater number of ridge and groove segments. The threadform utilizes a square or near-square form having a stab-flank 36 and load-flank 38 extending between crest 40 and root 42. The pitch-line 44, which is a stepped pitch line as will be described in greater detail below, is shown in dashed line form and the thread taper 46 is also shown in dashed line form. The threadform 30 is that of a pin member and the axial centerline 48 of the pin member is also shown, it being understood that the radial location of the centerline 48 is not necessarily to scale.

Load-flank 38 is illustrated having a load-flank angle a1 (measured against the radial axis, perpendicular to the axial direction of the tubular). As illustrated, stab-flank 36 includes three distinct surfaces—(1) the stab-flank base surface 50 extends radially from root 42 and has a stab-flank base angle a2; (2) the stab-flank clearance surface 54 extending radially from crest 40 and has a stab-flank clearance angle of a4, where a4 is greater than a2; and (3) the stab-flank cam surface 52 extends between stab-flank base surface 50 and stab-flank clearance surface 54 and has a stab-flank cam angle a3, where a3 is greater than a2 and less than a4. If the clearance surface is not used, the cam surface extends from the end of base surface to the thread crest at an angle of a3. As an example, stab-flank base angle a2 may be about 1 to 3 degrees (e.g., about 2 degrees), stab-flank cam angle a3 may be about 8 to 12 degrees (e.g., about 10 degrees), and stab-flank clearance angle a4 may be about 13 to 17 degrees (e.g., about 15 degrees). However, these angles are approximate and it should be appreciated by one skilled in the art that other angle values are possible. Stab-flank clearance surface 54 may be formed with an end radius 56 to facilitate load-flank clearance during initial engagement with a mating member. An end radius is also provided at the root of the stab flank and at both the crest and root of the load flank.

In the illustrated embodiment, stab flank base angle a2 is slightly more positive than the load flank angle a1. Also, the crest 40 and root 42 surfaces are parallel to the axis 48. The represented thread is a constant pitch thread. It is contemplated that the load flank angle could also be slightly positive rather than slightly negative as shown. In the illustrated embodiment, the cam surface 52 extends from the pitch line radially in a direction toward the crest and stops at a radial location that is collinear with the crest of the abutting, upstream thread ridge segment (i.e., the radially outer end of the cam surface is positioned at the same radial distance from the center line 48 as the adjacent smaller radius thread ridge segment).

As previously mentioned, and as shown in FIG. 2, the pitch line 44 is a stepped pitch line. Because as expressed above, a given threadform will have only a single pitch line, stepped pitch line 44 is the only pitch line associated with thread form profile 30. A first cycle 60 of the stepped pitch line 44 is defined by a line segment 62a passing through a thread ridge segment 32a of the profile and a line segment 64a passing through thread groove segment 34a of the profile. Line segment 64a is angularly offset from line segment 62a such that the line segments are not parallel. In the illustrated embodiment, line segment 62a is parallel with the center axis 48 of the member and line segment 64a angles radially away from the center axis when moving from the smaller diameter end of the thread or pin member to the larger diameter end of the thread or pin member. However, it is recognized that both line segments 62a and 64a could be angled relative to the axis 48, with the angle of line segment 64a being greater than the angle of line segment 62a. A second cycle 66 of the stepped pitch line 44 is defined by line segment 62b through a thread ridge segment 32b of the profile and line segment 64b through thread groove segment 34b of the profile. As shown, the groove segment 34a is bounded by both the thread ridge segment 32a and thread ridge segment 32b, and the thread groove segment 34b is adjacent the thread ridge segment 32b. Line segment 62b runs parallel to, but offset radially from line segment 62a. Likewise, line segment 64b runs parallel to, but radially offset from line segment 64a. Notably, the thread pitch line 46 is not parallel with any of the line segments that make up the stepped pitch line 44, and is therefore angularly offset from each line segment. The three dimensional body produced by rotation of the subject pitch line about the longitudinal axis of the connection, rather than being a traditional pitch "cone" as described above, is a stepped body having a repeating sequence of cylindrical and conical sections. In an embodiment where both line segments 62a and 64a are angled relative to the axis 48, the three dimensional body produced by rotation of the pitch line would be a repeating sequence of conical sections with alternating degrees of taper.

Figure 3:
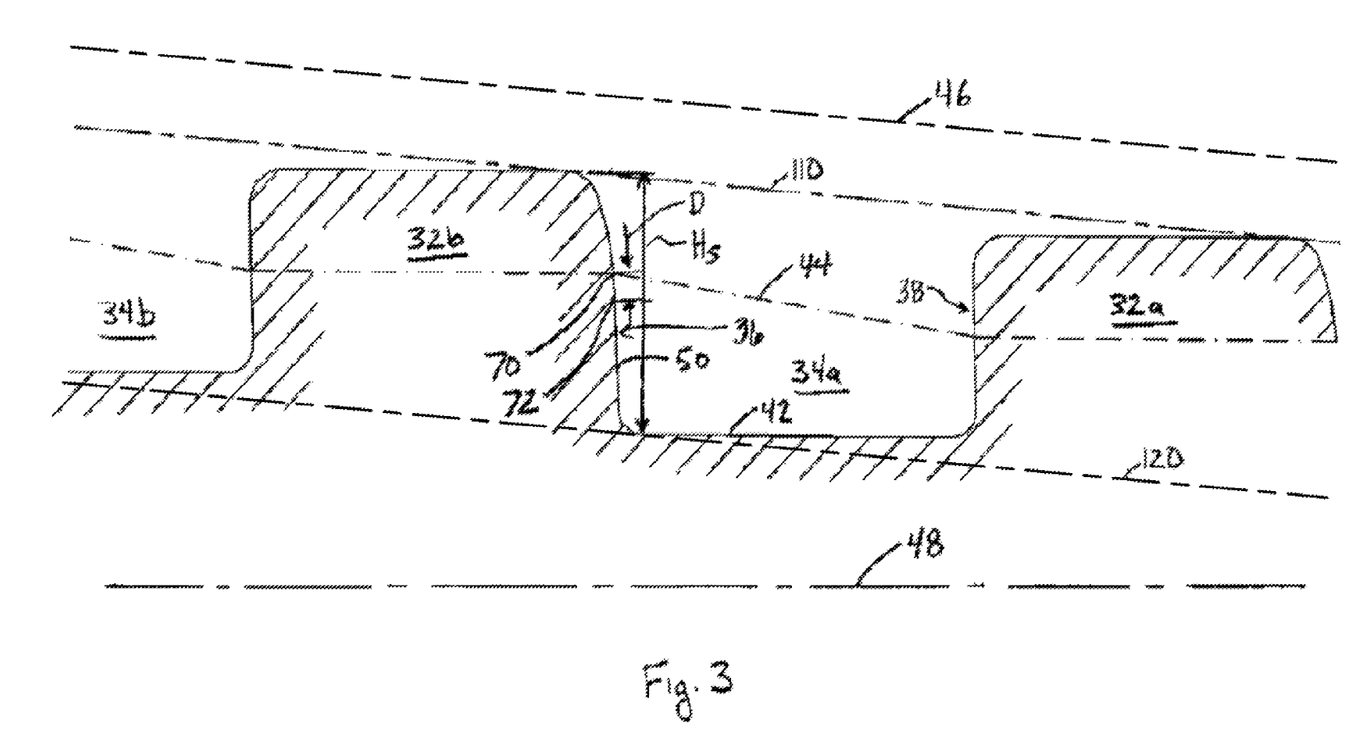

As shown in FIG. 3, the pitch line 44 intersects the stab flank 36 at a pin thread intersecting location 70 radially outward of a mid-point 72 of the height $H_s$ of the stab flank 36. Thus, unlike the traditional definition of a pitch line, as discussed above, the stepped pitch line is not located equidistant between the major and minor cones. Instead, as shown in FIG. 3, point 70 is closer, and possibly substantially closer, to the major cone XXX than to the minor cone XXX. This is accomplished by extending the base surface 50 outward from the root 42 to the pin thread intersecting location 70, rather than point 72. The radial distance D between point 72 and point 70 may be on the order of about eight to sixteen percent (e.g., at least about eight and one-half percent) of the overall stab flank height $H_s$.

It is contemplated that a favorable tubular connection can be formed by both a pin member and a box member having the identical threadform (radially outward thread on the pin member and radially inward thread on the box member), each threadform providing a profile with a stepped pitch line. With reference to FIG. 3, if the component was representative of a box member, point 70 would represent a box thread intersecting location of the pitch line that is positioned radially inward of the mid-point 72 of the height of the stab flank of the box member thread. The center axis of the member would be located above the illustrated profile rather than below the profile for such a box member. In such case, the base surface 50 would be extending radially inward to the box thread intersecting location.

Referring now to FIGS. 4-7, a tubular connection make-up sequence for a representative pin member 80 and box member 82 (both shown only in partial cross-section) is depicted.

The exact number of turns or rotation of one threaded member into the other threaded member required to produce the assembly sequence herein described may vary with the exact geometric proportions of the individual threadform used for the members. The sequence will be similar, but the exact number of turns may vary.

Figure 4:
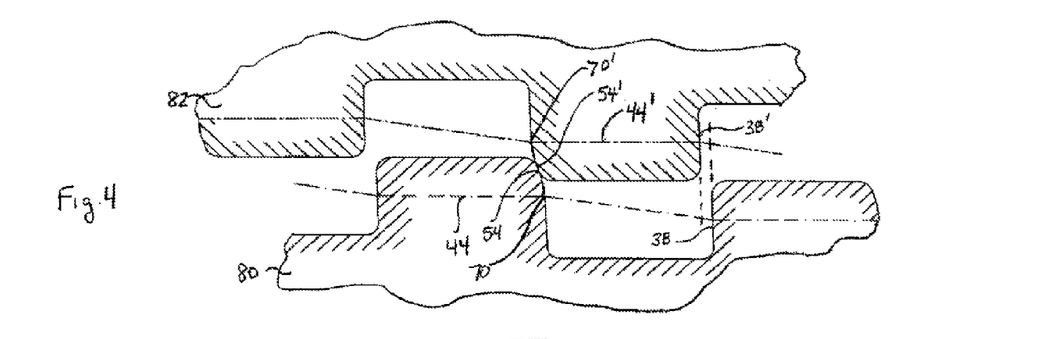
FIGS. 4 to 7 depict thread interaction during the make-up sequence of members incorporating the thread from of FIGS. 2 and 3.
Figure 5:
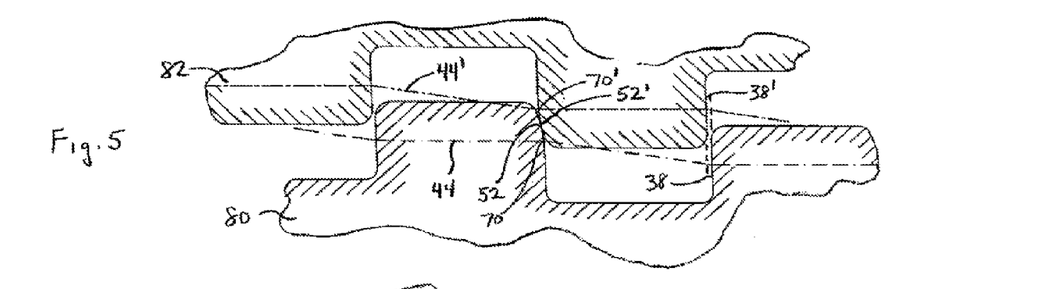

The corner radius and the clearance flank combine to provide clearance between the load flanks of the thread ridge and thread groove as illustrated in the stab position of FIG. 4. This clearance facilitates the entry of the thread ridge into the thread groove. During the first turn, stab flank engagement is between the clearance surfaces 54, 54' of the two threaded members. The angle of the clearance flank draws the load flanks closer together as the thread is rotated into increased engagement. If the thread of the members contains a cam surface 52, 52', as shown, as the threaded assembly enters its second turn (FIG. 5), stab flank contact shifts from the clearance surfaces 54, 54' to the cam surfaces 52, 52'. If not, assembly during the second turn remains on the clearance flank. Continuing assembly, i.e., rotation of one member into the other member closes the clearance between load flanks. In the example illustrated, at the end of the second turn (FIG. 6), the clearance is almost closed.

Figure 6:
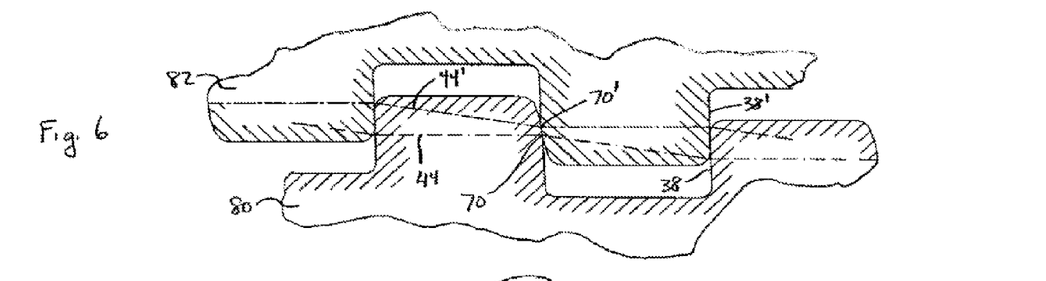

As the connection enters its third turn, the thread groove and thread ridge's load flanks engage, or are moved into substantive contact. This engagement or substantive contact can occur: before the stab flank base surfaces 50, 50' engage (i.e., before the thread intersecting locations 70, 11 70' of the stab flanks reach each other), in the case of threads with a small interference fit between the stab flanks, and as illustrated by FIG. 6. Alternatively, the engagement or substantive contact of the load flanks can also occur at the intersection of the stab flank pitch lines (i.e., when the thread intersecting locations 70, 70' of the stab flanks reach each other), in the case of threads that just make contact, starting at the intersections of the pitch lines on the load flanks. In still another alternative, the engagement or substantive contact of the load flanks can also occur after the pitch lines have passed each other (i.e., after the thread intersecting locations 70, 70' of the stab flanks pass each other, placing location 70' radially inward of location 70 per FIG. 7), in the case where a small clearance exists between the stab flanks.

At this juncture, all clearance between the threads is gone, or due to tolerances, substantively gone. This elimination of larger gaps between both the load and stab flanks, regardless of other events within the threaded connection such as engagement of metal seals or torque shoulders, is one distinguishing feature of the subject tubular connection. As a function of the tolerances of the tool inserts that are used to machine the threadform (on the order of less than 0.001 of an inch) the threads may have a small clearance between flanks, no clearance between flanks, or a small interference fit between the thread flanks. In this regard, as used herein the terminology "substantive contact" is intended to encompass both direct contact (e.g., either just in contact or in contact via an interference fit) and near contact (e.g., surfaces within 0.002" of each other). FIG. 6 illustrates the case of a small interference fit, just a small rotational increment past the 2 turn position, where the stab flank engagement is still on the cam surfaces (or clearance surfaces if the cam surface is not present). The detailed view of both load and stab flank show that practically no clearance exists between the stab or the load flanks of the threads.

As the connection continues to be engaged, the base surface of the stab flank and the load flank continue to slide upon the respective mating surfaces until the root and crests of the thread engage. Note, either the root or the crest will engage first, followed shortly by the other. The order will again depend on the tolerances of the inserts and machined parts.

Figure 7:
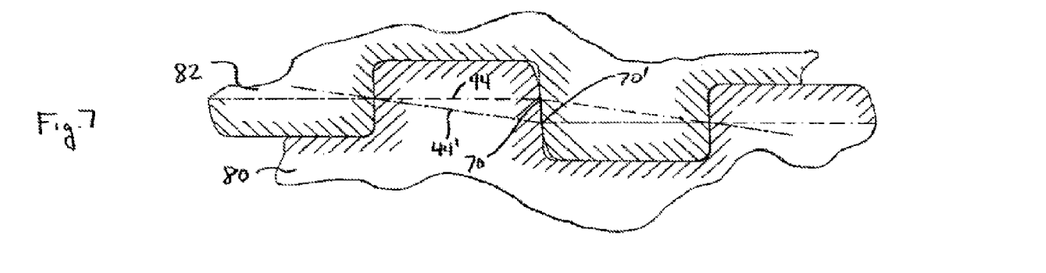
Figure 8:
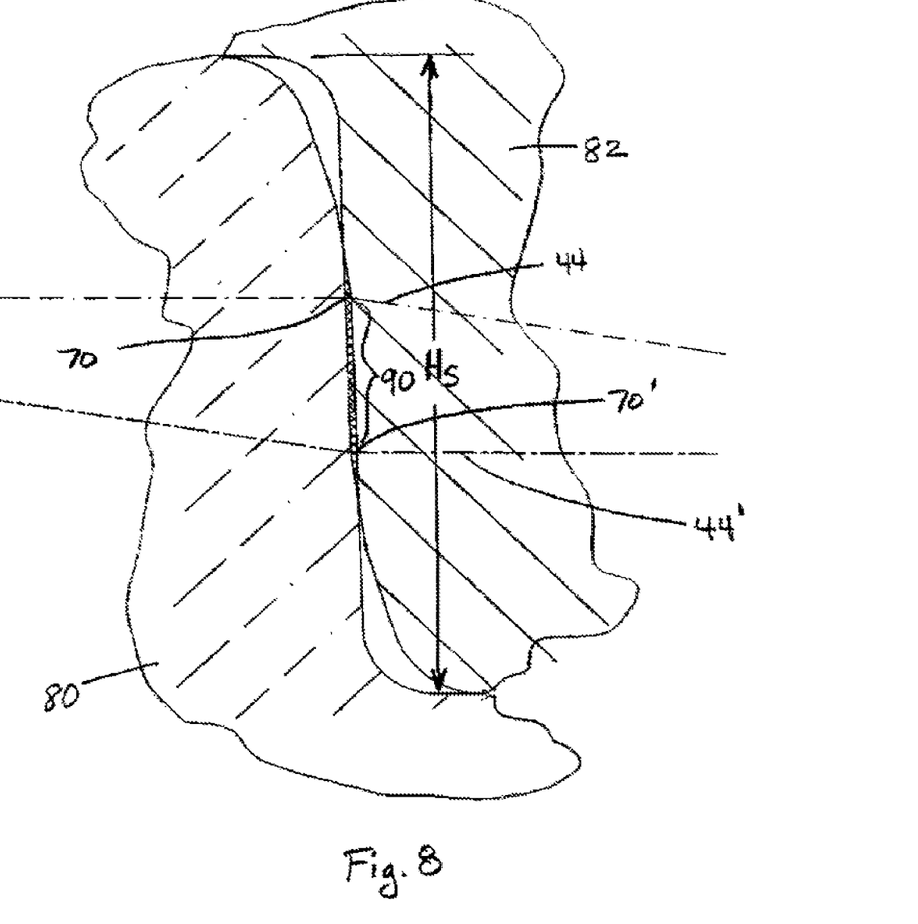
FIG. 8 is an enlarged view of stab flank substantive contact in an exemplary fully made up connection.

FIG. 8 is a detail view of the stab flanks of the thread of FIG. 7 at full thread assembly. The broad band of substantive contact 90 is readily apparent. As shown, when the connection is fully made up, the mid-point of the stab flank height of the pin member substantially aligns with the mid-point of the stab-flank height of the box member, and the radial band of substantive contact extends both radially outward of and radially inward of the substantially aligned mid-points. The band of substantive contact should be equal to or greater than 17% (e.g., preferably at least about 22%) of the stab flank height $H_s$ as previously noted. Achieving such a wide band of contact through Poisson's effect alone will result in thread damage and therefore is not commercially practical.

It should be appreciated that the threaded tubular connection of the present application may be used in an integral joint or in a coupled joint for tubular members. In an integral joint the pin and box members are joined integrally to the ends of the tubular members. In a coupled joint, a threaded coupling joins the threaded ends of the tubular members. The threaded tubular connection of the present invention is also applicable to all types of oil field tubulars including drill pipe, casing, and tubing. The connection may be used on plain end pipe, cold formed swaged ends, or hot forged upset ends.

In desirable embodiments, the tubular connection is typically included in the broad group identified as slim-line, high performance connections. The connection may be used in various embodiments such as integral flush-joint, with or without crimped sections, integral swaged with or without swaged sections, hot-forged upset on one or both members, or coupled with or without crimped pin ends. For either an integral or coupled connection, it is envisioned that the threadforms can be used in conjunction with other common premium connection features such as, without limitation, one or more metal seals (both internal and external), one or more torque shoulders for positive position stop (inside, outside, or center), and run-in/run-out threads.

Figure 9:
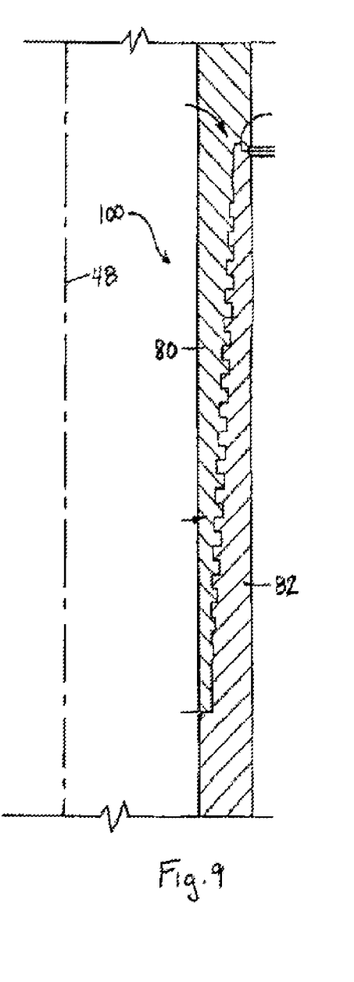
FIGS. 9 and 10 depict exemplary connection configurations into which the subject threadform can be incorporated.
Figure 10:
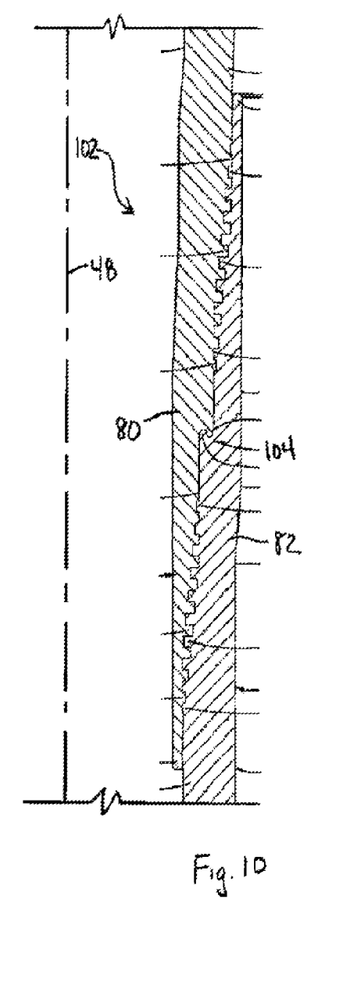

Exemplary connection configurations in which the threadform could be used are shown in FIGS. 9 and 10. In the slim-line flush joint 100 of FIG. 9, both the pin member 80 and box member 82 have a single tapered constant pitch thread. In the center-shoulder seal joint 102 of FIG. 10, both pin and box member have a respective pair of threads stepped in relation to each other and spaced apart by a center shoulder seal 104. Other connection configurations incorporating the threadform are contemplated.

The wide band contact achieved by the teachings herein contributes greatly to connection performance in compressive loading by adding area to the connection's cross-section that reacts to and resists compressive loads, thereby increasing the total compressive capacity of the connection to material yield. Such wide band contact also reacts immediately to compressive loading and limit movement within the connection, thereby isolating and protecting the metal seal during mechanical or thermal load cycles and improving the tri-axial pressure integrity of the connection.

It is to be clearly understood that the above description is intended by way of illustration and example only and is not intended to be taken by way of limitation. Changes and modifications could be made.

What is claimed is:

1. A tubular connection, comprising:
   a pin member having a tapered, constant pitch thread having a root, a crest, a stab flank and a load flank, the stab flank of the pin member thread having a base surface and a second surface, the base surface extending radially outward and away from the root at a base angle relative to radial, the second surface extending radially outward and away from the end of the base surface at a second angle relative to radial, the second angle greater than the base angle; and
   a box member having a tapered, constant pitch thread having a root, a crest, a stab flank and a load flank, the stab flank of the box member thread having a base surface and a second surface, the base surface extending radially inward and away from the root at a base angle relative to radial, the second surface extending radially inward and away from the end of the base surface at a second angle relative to radial, the second angle greater than the base angle;
   wherein a profile defined by the root, crest, stab flank and load flank of at least one of the pin member or the box member results in a single pitch line of the pin member or box member that is a stepped pitch line, wherein the stepped pitch line is the only pitch line for the profile and comprises:
      a first line segment passing through a first thread crest from a first point on the load flank of the first thread crest to a second point on the stab flank of the first thread crest, said first line segment being straight and uninterrupted by any discontinuity;
      a second line segment passing through a first thread groove from the second point on the stab flank the first thread crest to a third point on the load flank of a second thread crest, said second line segment being straight and uninterrupted by any discontinuity;

said second line segment being angularly offset from said first line segment.

2. The connection of claim 1, wherein a first cycle of the stepped pitch line is defined by a first line segment passing through a first thread ridge segment of the profile and a second line segment passing through a first thread groove segment of the profile, the second line segment angularly offset from the first line segment such that the first line segment is not parallel to the second line segment.

3. The connection of claim 2, where a second cycle of the stepped pitch line is defined by a first line segment through a second thread ridge segment of the profile and a second line segment through a second thread groove segment of the profile, the first thread groove segment hounded by the first thread ridge segment and the second thread ridge segment, the second thread groove segment adjacent the second thread ridge segment, wherein the first line segment of the second thread ridge segment runs parallel to, but offset radially from the first line segment of the first thread ridge segment, wherein the second line segment of the second thread groove segment runs parallel to, but radially offset from the second line segment of the first thread groove segment.

4. The connection of claim 2 wherein:
a thread taper associated with the one of the box member or the pin member is angularly offset from both the first line segment and the second line segment.

5. The connection of claim 2 wherein the second line segment is offset from a central longitudinal axis of the pin member or box member by an angle that is greater than any angle of offset that may exist between the first line segment and the central longitudinal axis.

6. The connection of claim 1 wherein each of the pitch line of the pin member and the pitch line of the box member is a stepped pitch line.

7. The connection of claim 6 wherein:
the pitch line of the pin member intersects the stab flank at a pin thread intersecting location radially outward of a mid-point of the height of the stab flank of the pin member thread, the base surface of the stab flank of the pin member thread extends outward to the pin thread intersecting location;
the pitch line of the box member intersects the stab flank at a box thread intersecting location radially inward of a mid-point of the height of the stab flank of the box member thread, the base surface of the stab flank of the box member thread extends inward to the box thread intersecting location.

8. The connection of claim 7 wherein:
when the connection is fully made up, the stab flank of the pin member thread and the stab flank of the box member thread are in substantive contact over a radial hand.

9. The connection of claim 8 wherein the radial band of substantive contact extends a radial distance that is equal to or greater than at least seventeen percent of stab flank height.

10. The connection of claim 9 wherein:
when the connection is fully made up, the mid-point of the stab flank height of the pin member substantially aligns with the mid-point of the stab-flank height of the box member, and the radial band of substantive contact extends both radially outward of and radially inward of the substantially aligned mid-points.

11. The connection of claim 1 wherein:
the stab flank of the pin member thread interacts with the stab flank of the box member thread during connection make-up to move the load flank of the pin member thread into substantive contact with the load flank of the box member thread.

12. The connection of claim 11 wherein the stab flank of the pin member thread and the stab flank of the box member thread are configured to interact during connection make-up such that the load flank of the pin member thread moves into substantive contact with the load flank of the box member thread before the pin member thread and the box member thread reach sixty-five percent of radial make-up engagement depth.

13. A threaded tubular member, comprising:
an elongated body having an axial passage therethrough, an end portion of the body having a tapered, constant pitch thread having a root, a crest, a stab flank and a load flank, the stab flank having a base surface and a second surface, the base surface extending radially outward and away from the root at a base angle relative to radial, the second surface extending radially outward and away from the end of the base surface at a second angle relative to radial, the second angle greater than the base angle, wherein a profile defined by the root, crest, stab flank and load flank of at least one of the pin member or the box member results in a single pitch line of the pin member or box member that is a stepped pitch line, wherein the stepped pitch line is the only pitch line for the profile and comprises:
a first line segment passing through a first thread crest from a first point on the load flank of the first thread crest to a second point on the stab flank of the first thread crest, said first line segment being straight and uninterrupted by any discontinuity;
a second line segment passing through a first thread groove from the second point on the stab flank the first thread crest to a third point on the load flank of a second thread crest, said second line segment being straight and uninterrupted by any discontinuity;
said second line segment being angularly offset from said first line segment.

14. The tubular member of claim 13, wherein a first cycle of the stepped pitch line is defined by a first line segment passing through a first thread ridge segment of the profile and a second line segment passing through a first thread groove segment of the profile, the second line segment angularly offset from the first line segment such that the first line segment is not parallel to the second line segment.

15. The tubular member of claim 14 wherein a thread taper defined by the profile is angularly offset from both the first line segment and the second line segment.

* * * * *